United States Patent
Prill

(10) Patent No.: US 6,890,365 B2
(45) Date of Patent: May 10, 2005

(54) REVERSE-FLOW BAGHOUSE

(75) Inventor: Fredric W. Prill, North Aurora, IL (US)

(73) Assignee: Dillman Equipment, Inc., Prairie du Chien, WI (US)

( * ) Notice: Subject to any disclaimer, the term of this patent is extended or adjusted under 35 U.S.C. 154(b) by 0 days.

(21) Appl. No.: 10/435,291

(22) Filed: May 9, 2003

(65) Prior Publication Data

US 2004/0221721 A1 Nov. 11, 2004

(51) Int. Cl.$^7$ .......................... B01D 46/00; B01D 29/66
(52) U.S. Cl. .......................... 55/302; 55/283; 55/293; 55/284; 95/280; 96/426; 96/427
(58) Field of Search .................. 55/283, 302, 293, 55/284; 95/280; 96/426, 427

(56) References Cited

U.S. PATENT DOCUMENTS

| | | |
|---|---|---|
| 2,836,256 A | 5/1958 | Caskey |
| 3,057,137 A | 10/1962 | Perlis et al. |
| 3,078,646 A | 2/1963 | Leech et al. |
| 3,345,806 A | 10/1967 | Bullock et al. |
| 3,861,893 A | 1/1975 | Smith et al. |
| 3,898,062 A | 8/1975 | Slakey |
| 3,951,627 A | 4/1976 | Barr, Jr. et al. |
| 3,975,173 A | 8/1976 | Peterson et al. |
| 3,990,871 A | 11/1976 | Cooper |
| 3,999,968 A | 12/1976 | Brookman |
| 4,068,970 A | 1/1978 | Rowe |
| 4,071,337 A | 1/1978 | Evans |
| 4,099,940 A | * 7/1978 | Mortensen et al. ........... 55/300 |
| 4,139,318 A | 2/1979 | Jakob et al. |
| 4,144,042 A | * 3/1979 | Noland ........................ 55/287 |
| 4,147,522 A | 4/1979 | Gonas et al. |
| 4,219,343 A | 8/1980 | Peterson |
| 4,233,041 A | 11/1980 | Noland |

(Continued)

FOREIGN PATENT DOCUMENTS

DE    29 31 403 A1    3/1980

OTHER PUBLICATIONS

"UltraFlo Portable Baghouse," brochure of Gencor Industries Inc., date unknown.

"Roto-Aire™ Baghouses—The Draft That Cleans," CMI Corporation brochure (1992).

Primary Examiner—Minh-Chau T. Pham
(74) Attorney, Agent, or Firm—Wallenstein Wagner & Rockey, Ltd.

(57) ABSTRACT

An apparatus and method for removing particulate from a particulate-laden gas stream are disclosed. The apparatus and method include a reverse-flow process for cleaning filter bags with a cleaning gas stream. The process includes: flowing a particulate-laden gas stream to one side of the filter bags; stopping the particulate-laden gas stream to at least one filter bag; popping the filter bag with a reverse-flow of a cleaning gas stream to remove dust from the bag; and finally re-introducing the particulate-laden gas stream to the recently cleaned filter bag at a low velocity/flow rate to prevent small particles from blowing through the recently cleaned filter bag. The apparatus and method allow the particulate-laden gas stream and cleaning gas stream to be controlled independently.

58 Claims, 5 Drawing Sheets

U.S. PATENT DOCUMENTS

| | | | |
|---|---|---|---|
| 4,239,061 A | 12/1980 | Peterson | |
| 4,246,014 A | 1/1981 | Wright et al. | |
| 4,247,310 A | 1/1981 | Borst | |
| 4,252,415 A | 2/1981 | Klein et al. | |
| 4,261,714 A | 4/1981 | Peterson | |
| 4,299,604 A | 11/1981 | Brenholt | |
| 4,310,336 A | 1/1982 | Peterson | |
| 4,320,987 A | 3/1982 | Rowe et al. | |
| 4,364,749 A | 12/1982 | Dunseith | |
| 4,372,926 A | 2/1983 | Gude et al. | |
| 4,376,638 A | 3/1983 | Dunseith | |
| 4,378,979 A | 4/1983 | Dunseith | |
| 4,399,837 A | 8/1983 | Goodboy, Jr. | |
| 4,402,119 A | 9/1983 | Peterson et al. | |
| 4,445,914 A | 5/1984 | Richard | |
| 4,469,446 A | 9/1984 | Goodboy | |
| 4,507,130 A | 3/1985 | Roth | |
| 4,512,787 A | 4/1985 | Mathews | |
| 4,571,330 A | 2/1986 | Krigmont et al. | |
| 4,581,135 A | 4/1986 | Gerulis | |
| 4,589,981 A | 5/1986 | Barari et al. | |
| 4,600,415 A | 7/1986 | Barton | |
| 4,668,253 A | 5/1987 | Lonardi et al. | |
| 4,681,607 A | 7/1987 | Bollerhey | |
| 4,778,491 A | 10/1988 | Yow, Sr. | |
| 4,932,785 A | 6/1990 | Bracegirdle | |
| 5,095,607 A | 3/1992 | Simon et al. | |
| 5,120,333 A | 6/1992 | Davis | |
| 5,129,922 A | 7/1992 | Kaiser | |
| 5,174,797 A | 12/1992 | Yow, Sr. et al. | |
| 5,193,291 A | 3/1993 | Brashears | |
| 5,209,563 A | 5/1993 | Swisher, Jr. et al. | |
| 5,318,199 A | 6/1994 | Brashears | |
| 5,332,164 A | 7/1994 | Page | |
| 5,344,088 A | 9/1994 | Page | |
| 5,397,177 A | 3/1995 | Swisher, Jr. | |
| 5,405,421 A | 4/1995 | Swisher, Jr. | |
| 5,425,923 A | 6/1995 | Swisher, Jr. et al. | |
| 5,492,432 A | 2/1996 | Eben et al. | |
| 5,514,194 A | 5/1996 | Tulis et al. | |
| 5,529,592 A | 6/1996 | Margraf | |
| 5,538,340 A | 7/1996 | Brashears | |
| 5,549,734 A * | 8/1996 | Standard | 95/279 |
| 5,772,317 A | 6/1998 | Butler | |
| 5,791,815 A | 8/1998 | Rowe | |
| 5,814,114 A * | 9/1998 | Stueble | 55/284 |
| 5,938,818 A * | 8/1999 | Miller | 95/63 |
| 6,050,423 A | 4/2000 | Dunnuck et al. | |
| 6,185,842 B1 | 2/2001 | Brashears | |
| 6,267,493 B1 | 7/2001 | Swisher, Jr. et al. | |
| 6,544,317 B2 * | 4/2003 | Miller | 95/63 |
| 6,605,139 B2 * | 8/2003 | Felix | 95/280 |
| 6,736,881 B2 * | 5/2004 | Leibold et al. | 95/280 |
| 6,749,665 B2 * | 6/2004 | Bjarnøet al. | 95/20 |

\* cited by examiner

REVERSE-FLOW BAGHOUSE

DESCRIPTION

1. Technical Field

The present invention generally relates to filtering gas streams and more particularly, to a method and apparatus for filtering particulate-laden gas streams from portable and permanent asphalt manufacturing plants utilizing a reverse-flow cleaning process.

2. Background of the Invention

Asphalt is typically produced by heat drying virgin asphalt aggregate and by adding to it and mixing with it liquid asphalt cement, fillers and other additives, often including reclaimed asphalt pavement. Often times, asphalt is also made by drying virgin mineral aggregate and moving it to a batch plant tower for batch mixing with the asphalt and other additives.

As the aggregate and reclaimed asphalt are dried, dust us created and carried by the hot gases required for the manufacturing process. Emission regulations prohibit the discharge of such gases with dust to the atmosphere. Government standards relate to particulates' particle size and concentration, as opposed to content. In addition, the dust created may represent a portion of the fine aggregate material needed in the particular mix. As a result, dust collection or recovery systems, such as baghouses and cyclone separators, are used for the removal of the dust before further processing of the gases and exhaust to the atmosphere.

While the baghouses remove particulate from the gas stream, the exhaust may also need to be treated to remove other non-particulate dangers such as sulfur dioxide, nitrogen oxides, volatile organic compounds, and carbon monoxide. The dust and gas conveyed to a baghouse or other similar air or gas filtering system are separated; the dust is separated and collected for later use while the cleaned gases are vented to the atmosphere.

Generally, in the production of asphalt, there are two primary types of baghouses, portable and stationary. Stationary baghouses are associated with stationary asphalt plants. For stationary applications, the asphalt making materials are brought from offsite locations to the plant, the asphalt is produced, and the asphalt product is taken to an offsite location for use. Stationary plants are generally used when the equipment necessary for production would be too large to travel on roads. More commonly today, asphalt plants are portable. The plant is brought to the job site or nearby and the asphalt is made and used at the site. Portable plants can be set up and taken down relatively quickly. Additionally, their locations reduce the transport time between the plant and the site or location where the finished product is to be used.

Currently, baghouses are employed at many asphalt manufacturing plants, stationary and portable, for cost effective compliance with emission requirements. Typically, the baghouse is placed between the drying equipment and an exhaust fan so that particle-laden exhaust gases are drawn through the baghouse from an inlet to an outlet. Typically, inside a baghouse there are a number of fabric filters (bags) suspended into the baghouse chamber. The filter bags are generally two or more sided mesh-like structures with a central opening. Certain flow paths through the filter bags tend to cause them to collapse, so frames are frequently utilized to support the interior of the bags to ensure they remain in an open, expanded position irrespective of flow path.

The baghouse operates by allowing the gas stream to pass through the walls of the bags, catching the particles on the bag's walls. Thus, if the flow of dirty air is from outside the bag (to the inside of the bag and out an outlet), particles will be caught on the outer surface of the bag. As noted, the bags typically have a mesh or screen size. Thus, particles larger than the mesh or screen side are caught on and in the exposed bag surface.

Other similar filtering processes such as fiber collectors and clean rooms operate in similar manners. These systems essentially collect particulate material and/or moisture from an incoming stream and separate the particulate or moisture from the cleaned gas stream. For example, fiber collectors are utilized in places such as cotton processing facilities to separate cotton fiber and dust from exhaust gas streams produced in the manufacturing facility. Clean rooms also utilize filtered gas streams, but instead of exhausting a cleaned gas stream to the ambient atmosphere, clean rooms utilize filtered ambient atmosphere by removing particulate and moisture before exhausting the cleaned gas into the clean room.

As the above mentioned baghouses/filtering equipment operate, the particles begin to clog the filters and restrict, or choke, the flow of the gas stream. The phenomena occurs because particles will get captured in the bag's or filter's mesh and cling or hold to the mesh. As the particles collect/cling, they build up on the mesh structure itself and on other captured particles. The result of this build-up is the steady reduction of the mesh size or opening. If not properly cleaned or replaced, this clinging process can continue until the mesh openings are totally blocked, preventing the flow of any further gas (dirty air) through the bag walls.

One method to counteract this build-up and subsequent choking is to periodically push air or other cleaning gas streams through the bag's walls in the opposite direction of the particulate-laden gas stream (reverse-flow), loosening and freeing the particles held by the bag's walls. In a typical baghouse, the particles fall downward to the bottom of the baghouse. At the bottom, one or more augers are situated and configured to sweep and move the particles from the baghouse to a collection system. The various gas streams (cleaning gas, cleaned gas and particulate-laden gas) can be controlled by conventional method such as with valves, baffles and diverters.

Reverse-flow cleaning is not new. Several others have tried different techniques and equipment to improve upon the effectiveness of baghouses and filtering systems utilizing reverse-flow cleaning. Such attempts are shown in U.S. Pat. Nos. 5,529,592 to Margraf; U.S. Pat. No. 5,514,194 to Tullis; U.S. Pat. No. 5,405,421 to Swisher; U.S. Pat. No. 5,174,797 to Yow, Sr., et al.; U.S. Pat. No. 5,129,922 to Kaiser; and U.S. Pat. No. 4,681,607 to Bollerhey. The patent to Swisher is particularly interesting because it discloses a baghouse that utilizes the filtered gas stream as the cleaning gas stream. The apparatus, as described, uses valves to direct a portion of the exiting cleaned gas stream to specific bags in the baghouse for reverse-flow cleaning. This apparatus recycles a portion of the cleaned exhaust stream and forces it back through the system for a repetitive cycle. Additionally, the patent to Yow, Sr., et al. discloses a fiber collector that utilizes an air inlet to create a reverse-flow cleaning stream for removal of fibers from the filters. The fiber collector opens the cleaning air inlets when pressure sensors indicate that the filters are becoming full and require cleaning. And, the patent to Kaiser discloses a system that utilizes two separate vacuum systems to reverse the gas flow through the filter elements. A particle-laden gas stream is circulated utilizing a vacuum system to draw the particle-laden stream from the input side of the filter elements towards the output side capturing the particles on the input side. In order to clean the filters utilizing a reverse-flow, a second stronger vacuum system is utilized to draw a gas stream in the reverse direction from the output side of the filter to the input side thus loosening and removing the particulate.

As noted, these above mentioned patents use a reverse-flow to clean the filter elements inside the filter apparatus or baghouse. They all operate wherein the particulate-laden gas stream and the cleaning gas stream each separately go online in a similar (parallel) fashion, e.g., with generally the same ratio of initial flow rate to full operating flow rate. For example, if the cleaning gas stream goes online quickly or fast, the particulate-laden gas stream goes online quickly or fast. Similarly, if the reverse flow cleaning gas stream goes online slowly, the particulate-laden gas stream will generally go online slowly.

It should be noted that having some particles clinging to the filter material's mesh structure adjacent the filter material's openings is good. A slight build-up of particles on the filter bags actually improves the filter's performance because the pores/openings are a little smaller in area than when they are totally clean or new.

This parallel online—offline flow (quick/quick or slow/slow) has certain drawbacks. For example, if the particulate-laden gas stream comes online at a recently cleaned bag quickly, the mesh structure of the filters will not necessarily catch some of the high velocity very fine particles. As a result, the mesh openings (or pores) will not catch some particles. If the clean gas stream comes online at a bag to be cleaned slowly, the openings in the mesh (or pores) are not necessarily thoroughly cleaned. Quite possibly too many of the particles will remain clinging to the mesh structure. As such, the filter will clog up sooner.

In order to comply with regulations, the baghouse or filter must effectively remove particles larger than a predetermined size from particle-laden stream and prevent particles from blowing through the bags even for just a brief period of time when the bag is going back online.

As a result, there is a need for a practical method and apparatus for creating different flow rates for the cleaning and particulate-laden gas streams as they come online or go offline.

SUMMARY OF THE INVENTION

The present invention relates to an apparatus and method for controlling the flow rate of the particulate-laden gas stream and cleaning gas stream individually in a reverse-flow baghouse or other filtering apparatus. One object of the present invention is to allow a cleaning gas stream to be introduced with a high velocity to pop the caked on dust and blow it off the filter bags.

Another object of the invention is to re-introduce a particulate-laden gas stream slowly back to cleaned filter bags to prevent small particles from flowing through the recently cleaned bags. Eventually, the particulate-laden gas stream will flow to the recently cleaned filter bags at the full flow rate and velocity.

Yet another object of the present invention is to provide an apparatus that can control the velocities and flow rates of the cleaning and particulate laden gas streams independently.

Other advantages and aspects of the present invention will become apparent upon reading the following description of the drawings and the detailed description of the invention.

BRIEF DESCRIPTION OF THE DRAWINGS

In the accompanying drawings forming part of the specification, and in which like numerals are employed to designate like parts throughout the same.

DETAILED DESCRIPTION

Figure 1:
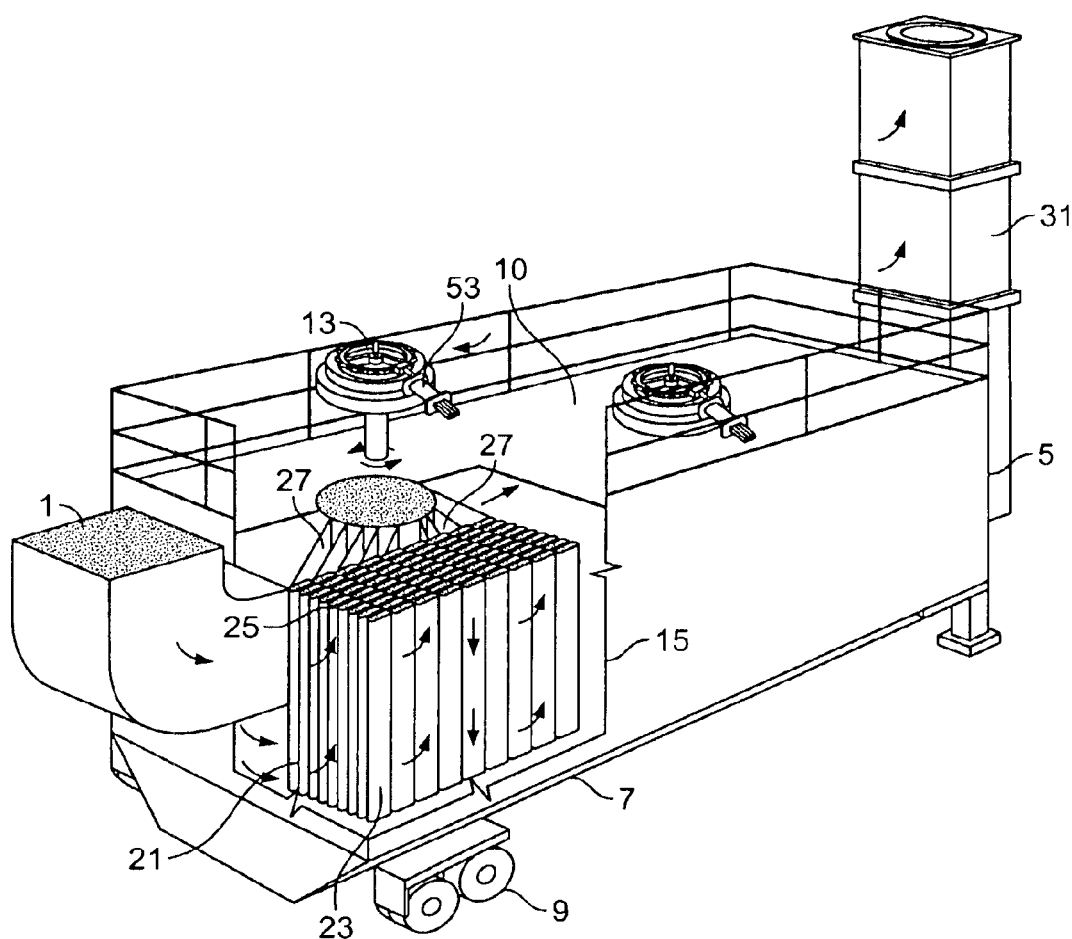
FIG. 1 is a side perspective cut-away view of a baghouse showing the channels and filters therein.

While this invention is susceptible of embodiments in many different forms, there is shown in the drawings and will herein be described in detail, preferred embodiments of the invention with the understanding the present disclosure is to be considered as an exemplification of the principles of the invention and is not intended to limit the broad aspect of the invention to the embodiments illustrated.

The term "particulate-laden gas stream" is generally defined as a gas stream containing dust, debris, asphalt aggregate, and the like. In short, it is dirty air coming from the dryer(s). The term "filtered gas stream" is generally defined as a gas stream virtually free from particles larger than a predefined size. Typically, the filtered gas stream will not contain particles larger than 10 microns, although the apparatus may be adjusted to prevent even smaller particles from exiting in the filtered stream. The term "cleaning gas stream" is generally defined as any gas stream virtually free from particles larger than a predetermined size. Specifically, in the present disclosure, such cleaning gas stream used to clean the filters by reverse flow is air, and more particularly, ambient air outside the baghouse.

The particulate-laden gas stream can come from any source that exhausts gas containing particulate material. In the present embodiment, the present invention is used in a baghouse for filtering the exhaust gas from mixers, dryers and other equipment related to asphalt manufacturing.

Referring to FIG. 1, a perspective view of an embodiment of the present invention is shown. A baghouse 10 is shown for portable applications. The baghouse 10 is supported by a frame 7 and can be transported using wheels 9. The exterior housing 15 has been partially cut away to display the interior of the baghouse 10. As displayed by the cut-away portion of the baghouse 10, channels 27 are disposed within the baghouse 10. Generally represented, filter bags 21 may be inserted into slots 22 (FIG. 2) in the channels 27. Any number of channels 27 and filter bags 21 may be utilized according to the present invention.

The filter bags 21 are typically constructed of conventional woven fabric or felt material. Each filter bag 21 comprises an inlet side 23 and an outlet side 25. The filter bags 21 are also typically supported by wire cages on the outlet side (not shown) to prevent them from collapsing.

As known in the art, the filter bags are employed to prevent particulate from traversing from the inlet side to the outlet side of the channels and the baghouse. The fabric material, well known in the art, is designed to allow gas to permeate through the bags, but prevent dust and other particulate from passing through. Typically, the filter bags 21 have one end which opens to the channels 27 whereby the outlet side 25 is in communication with the channels 27. The inlet side 23 of the filter bags 21 is exposed to a lower inlet chamber 32.

A baghouse 10 is shown for filtering a particle-laden gas stream (not shown). The particle-laden gas stream to be filtered is drawn in through the inlet 1 via a conventional suction fan 3 at the outlet 5. The suction fan 3 creates a negative pressure at the outlet 5, causing the particle-laden gas stream to be drawn through the baghouse 10.

As the particle-laden gas stream journeys through the baghouse, it may enter any of a plurality of filter bags 21 (generally referred to). The particle-laden gas stream enters a filter bag 21 on the inlet side 23 allowing the filtered gas stream to pass through the outlet side 25 while preventing the particulate from passing through the bag. The filtered gas stream flows from the outlet side 25 through the channels 27 to the upper outlet chamber 34 then to the outlet 5. The filtered gas stream finally exits the baghouse 10 through the exhaust stack 31.

Figure 2:
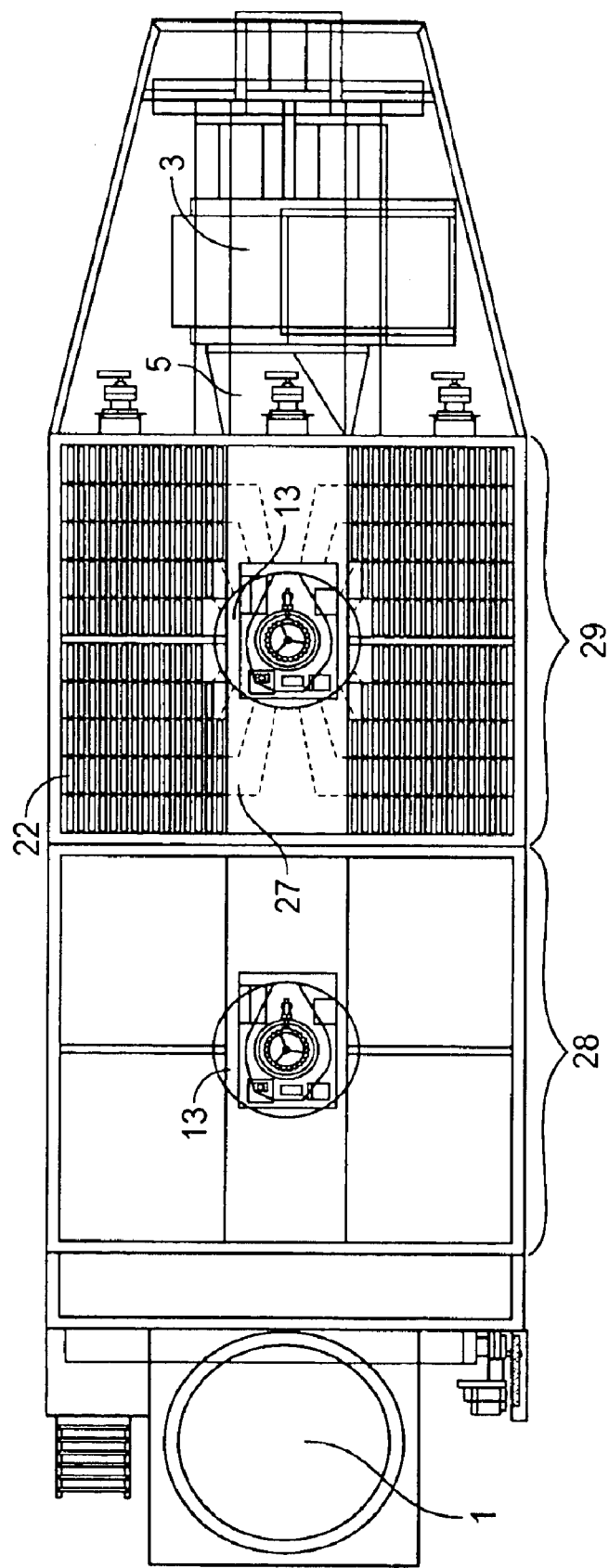
FIG. 2 is a top plan view of the interior of a baghouse showing the inlet, one section showing the channels, one section showing the filters in the channels, and the outlet.

FIG. 2, a top plan view of the baghouse 10, more clearly shows the inlet 1, filtering sections 28 and 29, and the outlet 5. The filtering section 28 shows the channels 27 and slots 22, while the filtering section 29 shows filter bags 21 in slots 22 in the channels 27. As previously described, the particle-laden gas stream is drawn in through the inlet 1 by way of a suction fan 3 to the outlet 5 of the baghouse. Thus, the particle-laden gas stream is drawn through both filtering sections 28, 29. The particle-laden gas stream flows generally in the same manner in both filtering sections 28,29. Although two filtering sections are shown in the present embodiment, one or any number of filtering sections may be utilized according to the present invention. In fact, the filtering sections are modular and can be arranged both serially and in parallel to handle different plant configurations, requirements and needs.

Figure 3:
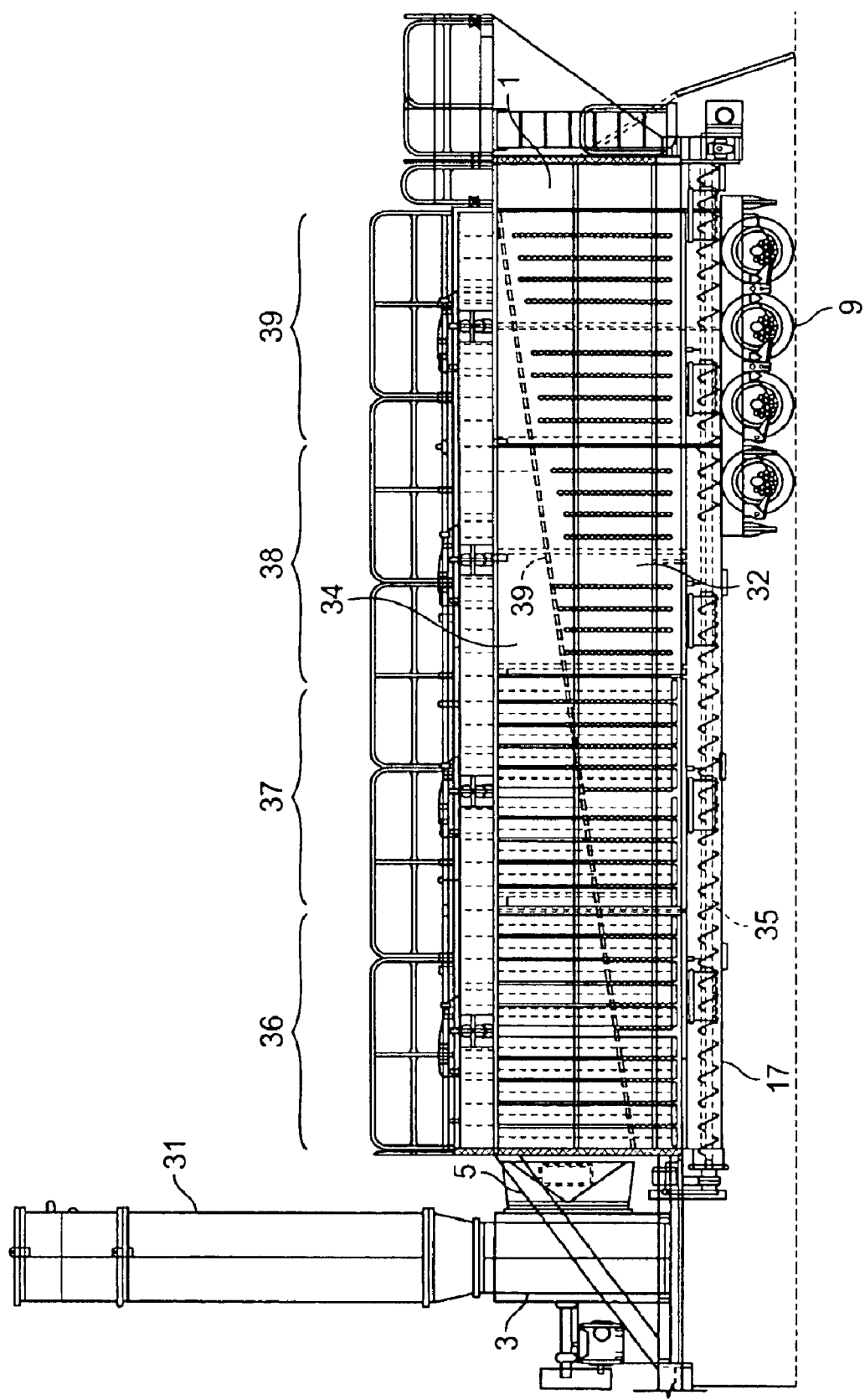
FIG. 3 is a detailed side elevation view of a baghouse showing the inlet, four modular sections showing the filters and channels, and the outlet including exhaust stack.

Referring now to FIG. 3, a detailed side elevation view of an embodiment of the baghouse of the present invention is shown. This view once again shows the inlet 1, the outlet 5, but instead this embodiment has four filtering sections 36,37,38,39. A divider 33 is also shown. The divider 33 separates the center portion of the baghouse 10 into a lower inlet chamber 32 and an upper outlet chamber 34. As the particle-laden gas stream passes through the filter bags 21, the cleaned gas stream flows through the channels to the outlet by way of the upper outlet chamber 34.

As the particle-laden gas stream passes through the filter bags 21, the filter bags 21 begin to accumulate particulate on the inlet side 23. As the system is operating, the effectiveness of the filter bags 21 begins to decrease and deteriorate because the flow rate of the particulate-laden air becoming more restricted. In order to counteract this accumulated particulate built up on the surface of the filter bags 21, the present invention utilizes a reverse-flow process to loosen and remove the accumulated particulate from the inlet side 23 on the filter bags.

This process is achieved by sending a high velocity cleaning gas stream in the opposite direction to the particulate-laden stream, thereby knocking the particulate loose, from and free of the filter bags. There are three flow stages involved in this process: initial popping of the bags to separate the dust from the surface of the bags; flushing the bags to force the dust off the bags; and settling of the dust to the floor of the apparatus. The initial popping stage is accomplished by quickly opening the valve to allow a high velocity stream of cleaning gas to expand the bag in the reverse direction of particulate-laden gas. The caked-on dust is separated from the bags, and is forced off the bags as the cleaning gas stream is maintained to flush away the dust. Finally, the valve is closed and the cleaning gas stream is shut off to allow the dust to settle to the floor of the apparatus.

Generally, in this reverse-flow process, the particulate falls to the floor 17 of the baghouse 10 and is removed from the baghouse 10 by augers 35 or similar well-known devices to later be recycled or disposed. The floor 17 of the baghouse 10 can be divided into multiple dust bins to collect the particulate as it falls from the filter bags 21. Multiple augers 35 may also be utilized to efficiently remove particulate from the baghouse 10.

According to the present invention, a nozzle 11 is utilized to control the flow of the particle-laden gas stream and direct the flow of the cleaning gas stream. The nozzle 11 is rotatable to and between the various channels 27 disposed within a filter section. In order to startup and shutdown the flow of the cleaning gas stream, a valve 13 is connected (in-line) to the nozzle 11. When the nozzle 11 is in the appropriate position, the valve 13 rapidly opens for a pre-determined period of time and then rapidly closes. The rapid opening and closing of this valve 13 causes a high velocity flow of cleaning air to be pushed from the ambient atmosphere towards the negative pressure created inside the baghouse 10 by the suction fan 3. In short, when the valve is closed, no air passes through the nozzle. When the valve is opened—quickly, a burst or blast of clear air passes to through the nozzle. This high flow of the cleaning gas stream is abrupt, loosening and removing the particulate from the inlet side 23 of the filter bags 21. The burst of air causes a "popping" of the filter bag. The high velocity of air along with the physical popping or snapping of the bag, shake and blast the particles from the bag. After the initial popping of the filter bag, the reverse air continues to further clean the bag.

Baghouses have long operated using a reverse-flow process for cleaning filter bags. As noted previously, typically in such setups, the cleaning gas stream and the particulate-laden gas stream are brought online to the channels in a similar manner. If the particulate-laden gas stream is brought online slowly to a recently cleaned channel, so is the cleaning gas stream. This design is not efficient for cleaning the filter bags because filter bags because two possible problems exist. Firstly, the filter bags may not be cleaned sufficiently because the cleaning gas stream comes on slowly, increasing the number of times the filter bags must be cleaned. The cleaning step may also be time consuming. Conversely, if the particulate-laden gas stream is brought online too quickly to a recently cleaned channel, the cleaning gas stream is brought online fast. In this setup, the cleaning gas stream can effectively remove particulate from the filter bags, but the particulate-laden gas stream is also brought online fast to the recently cleaned filter bags. This creates the problem of smaller particles jetting through the cleaned filter bags.

When discussing flow rate of the particulate-laden gas stream to each channel, the full flow rate is defined as approximately the total volume of the particulate-laden gas stream through the inlet 1 divided by the number of channels that have filter bags that are filtering the particulate-laden gas stream. The full flow rate of cleaning gas stream is related to the pressure gradient created between the pressure of the cleaning gas, either ambient atmosphere or the pressure of the cleaning gas stream's container, and the pressure inside the filtering apparatus such as a baghouse.

To circumvent the above mentioned problems, the present invention allows the cleaning gas stream to be brought online fast while allowing the particulate-laden gas stream to be brought on slow to the recently cleaned channel. Bringing the particulate-laden stream on slowly allows for a gradual buildup of particulate on the filter bags until they are sufficiently covered to allow a higher flow rate of the particulate-laden gas stream. In fact, the rate which the particulate-laden gas stream is brought back online to the recently cleaned channel is variable. For example, initially, the particulate-laden gas stream may be brought back online extremely slowly, but may become progressively faster. This approach to reverse-flow cleaning provides a shorter cleaning time which in turn allows the filter bags to be operating for a greater period of time, improving overall efficiency.

One embodiment of the present invention to accomplish the fast online cleaning gas stream accompanied by a slow on particulate-laden gas stream is by having a valve 13 coupled to and coordinated with the nozzle 11.

It should be known that the present invention is capable of operating utilizing a single valve or a plurality of valves. In the embodiment shown in the figures, the baghouse comprises a plurality of modular sections, with each section having a centrally located valve/nozzle. In another embodiment, a single valve can be utilized for all filter sections. It should be known to those skilled in the art that the present invention is capable of operating with any number of valves. Additionally, it should be known to those skilled in the art that any other similar apparatus to a valve may be utilized for the purpose of allowing a cleaning gas stream into the system. Such examples include poppet style valves and caps that are activated by hydraulic cylinders, pneumatic cylinders, or other mechanical devices such as cams.

The key, of course, is to have the clean gas stream to selectively and with control blast on-line and to close the flow when desired.

Figure 5:
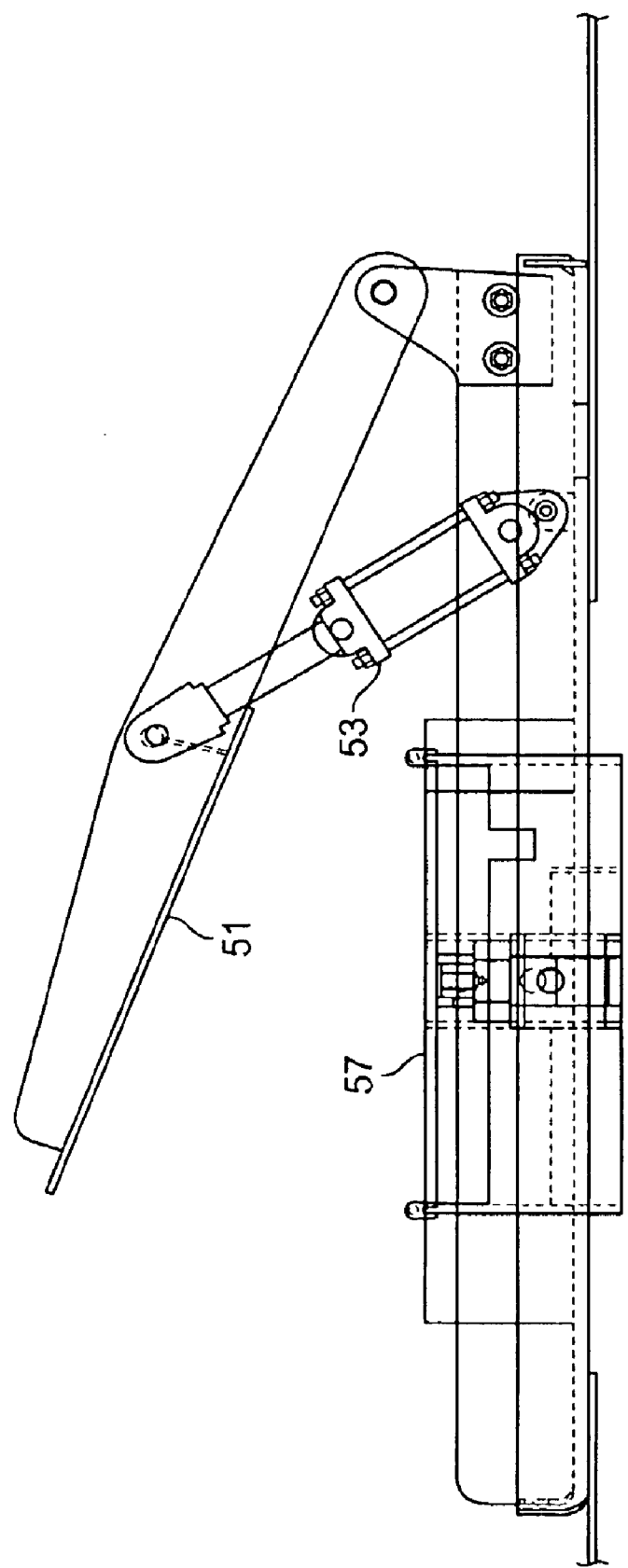
FIG. 5 is a side elevation view of a valve and actuating cylinder.

An example of one such apparatus is shown in FIG. 5. This figure shows a cap 51 articulated by an actuating cylinder 53. The cap 51 has been articulated to uncover the cleaning gas stream inlet 57. The cleaning gas stream inlet 57 allows the cleaning gas stream to enter a single filter section or a plurality of filter sections.

Figure 4A:
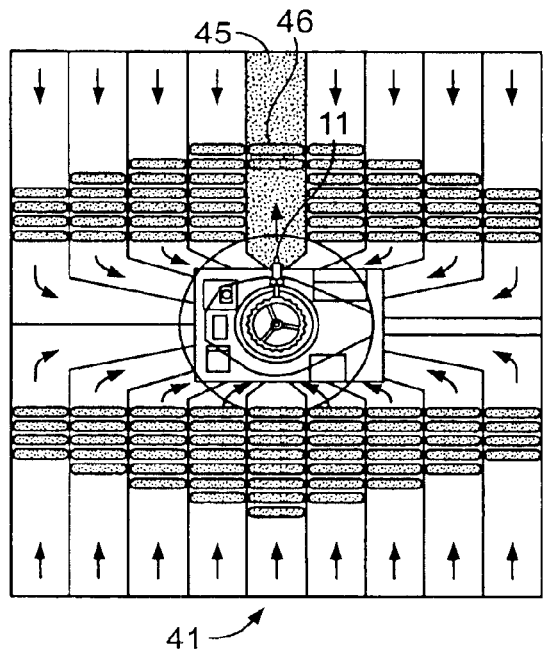
FIGS. 4a–c shows pictorially the steps of the present invention.
Figure 4B:
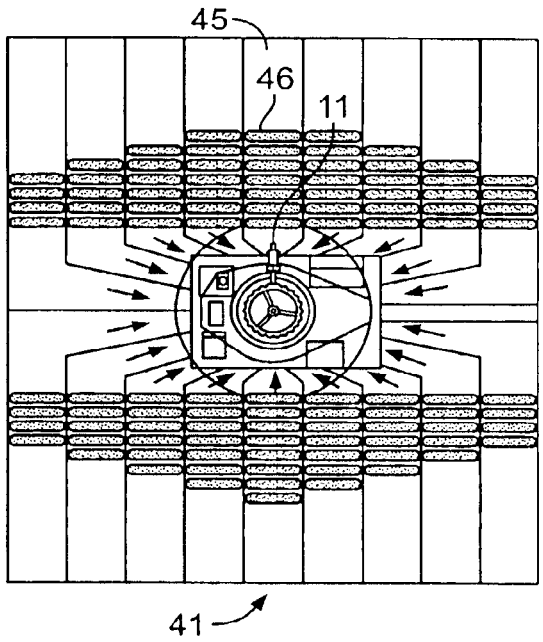
Figure 4C:
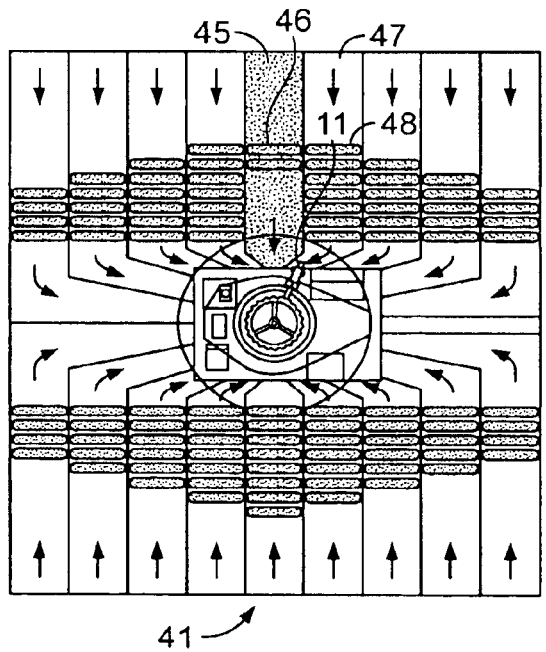

FIGS. 4a–c show steps related to the startup and shutdown of both the particulate-laden gas stream and the cleaning gas stream. In FIG. 4a, a filter section 41 is shown wherein a channel 45 is being cleaned. In this figure, the valve (not shown) is open for a predetermined period of time to allow the cleaning gas stream, atmospheric air, to be pushed into the baghouse because of the negative pressure created by the suction fan (not shown). The valve is open for approximately 2 seconds creating a high flow rate to loosen and remove the particulate from the inlet side 23 of the filter bags 21. The remaining channels are filtering the particulate-laden gas stream while the channel 45 is being cleaned.

FIG. 4b shows the nozzle 11 in the same position as in FIG. 4a, but now the valve (not shown) is closed. Because the valve is closed, there is no cleaning gas flow though the channel 45 nor the bags 46. Additionally, because the nozzle is still positioned at the channel 45, the particulate-laden gas stream will not flow through that channel and corresponding filter bags 46.

FIG. 4c shows the nozzle 11 slowly moving from channel 45 to channel 47. During this process, the nozzle slowly moves towards the next channel 47 to be cleaned allowing a limited flow of the particulate-laden gas stream to the previously cleaned channel 45 and thus the previously cleaned bags 46. The nozzle moves either at a linear rate or a variable rate to allow sufficient buildup of particulate on the filter bags 46 before the full flow rate of the particulate-laden gas stream is allowed. The rate that the nozzle moves is controllable and may be manipulated to correspond to various parameters such as particle size and particle concentration.

The slow startup of particle-laden gas stream to the recently cleaned filter bags prevents larger particles from blowing through the bags, thus increasing the effectiveness of the baghouse when compared to systems that have fast startup of particulate-laden gas stream to recently cleaned filter bags. In addition, as mentioned previously, a slight accumulation of particles on the bag actually increases the bag's effectiveness. The system also helps to ensure that the equipment meet the emissions requirements by not allowing larger particles to flow through recently cleaned channels and corresponding filter bags.

The following table represents a summary of the steps involved in the reverse-flow filtering apparatus of the present invention. For simplification purposes, the table assumes only five channels and corresponding filter bags. In operation, the filtering apparatus may have any number of channels and corresponding filter bags.

TABLE 1 showing the steps for reverse-flow cleaning of the present invention

| Step | Valve | Nozzle | Cleaning Gas Stream (Online) | Particulate-Laden Gas Stream (Online) |
| --- | --- | --- | --- | --- |
| 1. Cleaning | Open | Stationary | 1 | 2, 3, 4, 5 |
| 2. Transition Begins | Closed | Stationary | None | 2, 3, 4, 5 |
| 3. Rotation Begins | Closed | Moving | None | (2), 3, 4, 5, (1) |
| 4. Rotation Ends | Closed | Stationary | None | 3, 4, 5, 1 |

As described in Table 1, the embodiment is illustrated with five channels and an undisclosed number of corresponding filter bags. The steps do not have to start at a particular step, but they follow in the specified order and can continue at step one after step four. In the first step, the nozzle is stationary and the valve is open. In this step the first channel and corresponding filter bags are being cleaned with the cleaning gas stream. During this step, the remaining channels and corresponding filter bags are operating by filtering the particle-laden gas stream. This step is similar to that depicted in FIG. 4a.

The second step commences when the valve closes and the transition begins. In this step, neither the cleaning gas stream nor the particle-laden gas stream are flowing through the first channel and corresponding filter bags allowing the separated dust to fall to the floor of the baghouse. The nozzle is stationary and remains at the first channel. The particle-laden gas stream continues to be filtered by the remaining four channels and corresponding filter bags. This step is similar to that depicted in FIG. 4b.

The third step commences when the nozzle rotations begins. During this step, the nozzle rotates from the first channel to the second channel. The valve is closed and thus the cleaning gas stream is not flowing. The particle-laden gas stream is still operating at the third, forth, and fifth channels and corresponding filter bags. The particle-laden gas stream is slowly taken offline at the second channel and corresponding filter bags and slowly brought online to the recently cleaned first channel and corresponding filter bags as the nozzle slowly rotates. This step is similar to that depicted in FIG. 4c.

The forth step commences when the nozzle is stationary at the next channel and corresponding filter bags to be cleaned. In this example, the next channel to be cleaned is the second channel and corresponding filter bags. In this step, the valve is closed and thus the cleaning gas stream is not flowing. The particle-laden gas stream is still flowing and being filtered by the third, forth, and fifth channels and corresponding filter bags. The particle-laden gas stream is now operating at full flow rate through the first channel and corresponding filter bags, but not at the second channel and corresponding filter bags. This apparatus remains operating in this step for a predetermined period of time, or until the apparatus detects clogged channels and/or filter bags. This step looks similar to FIG. 4b, but the nozzle is pointed at a new channel and corresponding filter bags.

Once the forth step is complete, the cycle can start again at the present channel and corresponding filter bags. Optionally, it may rotate to any other channel and corresponding filter bags that require cleaning.

Additionally, the present invention can operate in a parked mode where all channels and corresponding filter bags are operating with full flow rates through each. In this mode, none of the channels or corresponding filter bags are being cleaned. The nozzle is pointed towards a position where no channels exist. In this situation, the nozzle is not preventing the particulate-laden gas stream from reaching any of the channels. Parked mode can be utilized when none of the channels and corresponding filter bags require cleaning so that all available filtering media can be utilized to improve overall efficiency.

The apparatus of the present invention can operate in a variety of manners. One such manner is utilizing the reverse-flow cleaning as described above to clean each channel and corresponding filter bags in an orderly fashion rotating from one channel to the next. Another such manner of operation is utilizing the reverse-flow cleaning as described above to clean only channels and corresponding filter bags that require cleaning. The apparatus may be configured to the detect channels and corresponding filter bags that require cleaning through any conventional monitoring means. One such means would be through pressure sensors. Pressure sensors can be utilized to detect pressure gradients from the inlet chamber to each of the channels. When the pressure gradient in a specific channel exceeds a specified threshold, the apparatus rotates to clean the channel and corresponding filter bags.

The above described steps can also be associated with other filtering apparatuses besides baghouses for filtering related to asphalt production. Any conventional filtering system or apparatus that requires cleaning of the filtering media, such as bags, panels, cones, or other media known in the art, may be capable of utilizing the present invention. Examples of such filtering processes that may utilize aspects of the present invention include fiber collectors such as in cotton processing facilities and particulate and moisture filtering processes for clean rooms.

The present invention may be utilized in many embodiments besides those mentioned herein. The filtering apparatus may operate with various numbers of filtering sections, channels, and filter bags or other media. Additionally, the number of filter bags in each channel do not have to be the same for all channels. Any number or combination may be used within the scope of the present invention.

While the specific embodiments have been illustrated and described, numerous modifications come to mind without significantly departing from the spirit of the invention and the scope of protection is only limited by the scope of the accompanying Claims.

I claim:

1. An apparatus for removing particulate from a particulate-laden gas stream comprising:
   a) a housing having an inlet and an outlet;
   b) a plurality of channels disposed within the housing between the inlet and the outlet;
   c) at least one filter disposed within each channel,
      i) each filter having an inlet side and an outlet side;
   d) exhaust means for drawing the particulate-laden gas stream from the inlet through at least one channel to the outlet and through the at least one filter from the inlet side to the outlet side;
   e) at least one valve for selectively cleaning the at least one filter in a channel to be cleaned with means for
      i) shutting down the flow of the particulate-laden gas stream from a full flow rate in an at least one channel to be cleaned and drawing a flow of a cleaning gas stream through the at least one channel to be cleaned and the at least one filter in that channel from the outlet side to the inlet side and through the at least one channel not being cleaned to the outlet;
      ii) thereafter shutting down the flow of the cleaning gas stream in the at least one channel to be cleaned and returning the flow of the particulate-laden gas stream to the at least one channel to be cleaned from the inlet to the outlet; and,
   f) means associated with the at least one valve for controlling the rates of
      i) shutting down the flow of the particulate-laden gas stream,
      ii) drawing a flow of the cleaning gas stream at a first flow rate,
      iii) shutting down the flow of the cleaning gas stream,
      iv) returning the flow of the particulate-laden gas stream at a second flow rate, wherein the second flow rate is less than the full rate and less than the first flow rate, and
      v) increasing the second flow rate until it is substantially equal to the full flow rate.

2. The apparatus of claim 1 wherein the means associated with the at least one valve comprises at least one nozzle and at least one channel.

3. The apparatus of claim 2 wherein returning the flow of particulate-laden gas stream to a cleaned channel is controlled by a movement of the at least one nozzle.

4. The apparatus of claim 2 wherein the at least one nozzle is rotatable.

5. The apparatus of claim 4 further comprising means for rotating the at least one nozzle.

6. The apparatus of claim 5 wherein the nozzle rotates to the at least one channel to be cleaned.

7. The apparatus of claim 6 wherein the flow of particulate-laden gas stream is shut down when the nozzle rotates to the channel to be cleaned.

8. The apparatus of claim 1 wherein the flow of cleaning gas stream is drawn through the at least one channel to be cleaned when the at least one valve opens.

9. The apparatus of claim 1 wherein the flow of cleaning gas stream is shut down when the at least one valve closes.

10. The apparatus of claim 1 wherein the exhaust means is a suction fan.

11. The apparatus of claim 1 wherein the cleaning gas stream is air.

12. The apparatus of claim 11 wherein the air is from the ambient atmosphere.

13. The apparatus of claim 1 wherein the at least one valve is a poppet style valve.

14. The apparatus of claim 1 wherein the at least one valve is articulated via means selected from the group comprising a hydraulic cylinder, a pneumatic cylinder, or a cam.

15. The apparatus of claim 1 wherein the means associated with controlling the rate of returning the flow of the particulate-laden gas stream provides a variable flow rate of the particulate-laden gas stream.

16. An apparatus for removing particulate from a particulate-laden gas stream comprising
   a) a housing having an inlet and an outlet;
   b) a plurality of channels disposed within the housing between the inlet and the outlet;
   c) at least one filter disposed within each channel,
      i) each filter having an inlet side and an outlet side;
   d) exhaust means for drawing the particulate-laden gas stream from the inlet through at least one channel to the outlet and through the at least one filter from the inlet side to the outlet side; and,
   e) at least one valve for selectively cleaning the at least one filter in a channel to be cleaned with means for
      i) shutting down the flow of the particulate-laden gas stream in an at least one channel to be cleaned and drawing a flow of a cleaning gas stream at a first flow rate through the at least one channel to be cleaned and the at least one filter in that channel from the outlet side to the inlet side and through the at least one channel not being cleaned to the outlet;
      ii) shutting down the flow of the cleaning gas stream in the at least one channel to be cleaned and returning the flow of the particulate-laden gas stream from the inlet to the at least one channel that was cleaned to the outlet;
      iii) thereafter starting up the flow of particulate-laden gas stream in the at least one channel that was cleaned at a second flow rate, wherein the second flow rate is lower than a full operating flow rate and the first flow rate;
      iv) adjusting the second flow rate of the particulate-laden gas stream to achieve substantially the full operating flow rate.

17. The apparatus of claim 16 wherein the means associated with the at least one valve comprises at least one nozzle and at least one channel.

18. The apparatus of claim 17 wherein starting up the flow of particulate-laden gas stream to a cleaned channel is controlled by a movement of the at least one nozzle.

19. The apparatus of claim 17 wherein the at least one nozzle is rotatable.

20. The apparatus of claim 19 further comprising means for rotating the at least one nozzle.

21. The apparatus of claim 20 wherein the nozzle rotates to the at least one channel to be cleaned.

22. The apparatus of claim 21 wherein the flow of particulate-laden gas stream is shut down when the nozzle rotates to the channel to be cleaned.

23. The apparatus of claim 16 wherein the flow of cleaning gas stream is drawn through the at least one channel to be cleaned when the at least one valve opens.

24. The apparatus of claim 16 wherein the flow of cleaning gas stream is shut down when the at least one valve closes.

25. The apparatus of claim 16 wherein the exhaust means is a suction fan.

26. The apparatus of claim 16 wherein the cleaning gas stream is air.

27. The apparatus of claim 26 wherein the air is from the ambient atmosphere.

28. The apparatus of claim 16 wherein the at least one valve is a poppet style valve.

29. The apparatus of claim 16 wherein the at least one valve is articulated via means selected from the group comprising a hydraulic cylinder, a pneumatic cylinder, or a cam.

30. The apparatus of claim 16 wherein the means for adjusting the second flow rate of the particulate-laden gas stream provides a variable flow rate of the particulate-laden gas stream.

31. An apparatus for removing particulate from a particulate-laden gas stream comprising:
   a) a housing having an inlet and an outlet;
   b) a plurality of channels disposed within the housing between the inlet and the outlet;
   c) at least one filter disposed within each channel,
      i) each filter having an inlet side and an outlet side;
   d) exhaust means for drawing the particulate-laden gas stream from the inlet through at least one channel to the outlet and through the at least one filter from the inlet side to the outlet side; and,
   e) at least one valve for selectively controlling an input of a cleaning gas stream;
   f) at least one nozzle for selectively directing the input of the cleaning gas stream;
   g) means associated with the at least one nozzle for controlling the movement of the at least one nozzle, wherein the at least one nozzle moves when the at least one valve prevents the input of the cleaning gas stream; and,
   h) at least one baffle for containing the flow of the cleaning gas stream in at least one channel.

32. The apparatus of claim 31 wherein the at least one nozzle controls an input of the particulate-laden gas stream to a clean channel.

33. The apparatus of claim 31 wherein the at least one nozzle is rotatable.

34. The apparatus of claim 33 further comprising means for rotating the at least one nozzle.

35. The apparatus of claim 34 wherein the nozzle rotates to the at least one channel to be cleaned.

36. The apparatus of claim 35 wherein the flow of particulate-laden gas stream is shut down when the nozzle rotates to the channel to be cleaned.

37. The apparatus of claim 31 wherein the flow of cleaning gas stream is drawn through the at least one channel to be cleaned when the at least one valve opens.

38. The apparatus of claim 31 wherein the flow of cleaning gas stream is shut down when the at least one valve closes.

39. The apparatus of claim 31 wherein the flow of the particulate-laden gas stream returns at a lower rate than a full operating flow rate.

40. The apparatus of claim 31 wherein the exhaust means is a suction fan.

41. The apparatus of claim 31 wherein the cleaning gas stream is air.

42. The apparatus of claim 41 wherein the air is from the ambient atmosphere.

43. The apparatus of claim 31 wherein the at least one valve is a poppet style valve.

44. The apparatus of claim 31 wherein the at least one valve is articulated via means selected from the group comprising a hydraulic cylinder, a pneumatic cylinder, or a cam.

45. The apparatus of claim 31 wherein the means associated with the at least one nozzle for controlling the movement of the at least one nozzle provides a variable rate of movement.

46. An apparatus for removing particulate from a particulate-laden gas stream having a full flow rate comprising:
   a) a housing having an inlet and an outlet;
   b) a plurality of channels disposed within the housing between the inlet and the outlet;
   c) at least one filter disposed within each channel
      i) each filter having an inlet side and an outlet side;
   d) exhaust means for drawing the particulate-laden gas stream from the inlet through the at least one channel to the outlet and through the at least one filter from the inlet side to the outlet side; and,
   e) control means for
      i) stopping the flow of the particulate-laden gas stream;
      ii) introducing a cleaning gas stream into at least one channel at a first flow rate; and,
      iii) subsequently introducing the particulate-laden gas stream into the at least one channel at a second flow rate, wherein the second flow rate is less than the first flow rate and the full flow rate, and progressively increasing the second flow rate of the particulate-laden gas stream until the second flow rate substantially equals the full flow rate.

47. The apparatus of claim 46 wherein the control means comprises at least one valve and at least one nozzle.

48. The apparatus of claim 47 wherein the nozzle is rotatable.

49. The apparatus of claim 46 wherein the exhaust means is a suction fan.

50. The apparatus of claim 46 wherein the cleaning gas stream is air.

51. The apparatus of claim 50 wherein the air is from the ambient atmosphere.

52. The apparatus of claim 46 wherein the at least one valve is a poppet style valve.

53. The apparatus of claim 46 wherein the at least one valve is articulated via means selected from the group comprising a hydraulic cylinder, a pneumatic cylinder, or a cam.

54. The apparatus of claim 46 wherein the control means for subsequently introducing the particulate-laden gas stream provides a variable flow rate.

55. A method for removing particulate from a particulate-laden gas stream comprising the steps of:
   a) enclosing a plurality of channels in a housing, wherein the housing has an inlet and an outlet and each channel has at least one filter disposed within and each filter has an inlet side and an outlet side;
   b) drawing a particulate-laden gas stream at a full operating flow rate from the inlet through an at least one channel to the outlet, and through the at least one filter from the inlet side to the outlet side;
   c) shutting down the flow of the particulate-laden gas stream in an at least one channel to be cleaned and drawing a flow of a cleaning gas stream at a first flow rate through the at least one channel to be cleaned and the at least one filter in that channel from the outlet side to the inlet side and through the at least one channel not being cleaned to the outlet;
   d) shutting down the flow of the cleaning gas stream in the at least one channel to be cleaned;
   e) starting up the flow of the particulate-laden gas stream to the at least one channel that was cleaned at a second flow rate, wherein the second flow rate is lower than the full operating flow rate and the first flow rate; and,
   f) adjusting the second flow rate of the particulate-laden gas stream to achieve substantially the full operating flow rate.

56. The method of claim 55 wherein the step of adjusting the second flow rate of the particulate-laden gas stream provides a variable flow rate of the particulate-laden gas stream.

57. The method of claim 55 wherein the step of starting up the flow of the particulate-laden gas stream comprises the step of setting the second flow rate of the particulate-laden gas stream to correspond to the size of the particulate in the particulate-laden gas stream.

58. The method of claim 55 wherein the step of starting up the flow of the particulate-laden gas stream comprises the step of setting the second flow rate of the particulate-laden gas stream to correspond to the concentration of the particulate in the particulate-laden gas stream.

* * * * *